United States Patent
Nomura

(10) Patent No.: US 8,965,683 B2
(45) Date of Patent: Feb. 24, 2015

(54) VEHICLE NAVIGATION SYSTEM

(71) Applicant: DENSO CORPORATION, Kariya, Aichi-pref. (JP)

(72) Inventor: Tomoo Nomura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 13/753,745

(22) Filed: Jan. 30, 2013

(65) Prior Publication Data

US 2013/0204520 A1 Aug. 8, 2013

(30) Foreign Application Priority Data

Feb. 7, 2012 (JP) .................................. 2012-23967

(51) Int. Cl.
G01C 21/36 (2006.01)

(52) U.S. Cl.
CPC .................................. *G01C 21/3658* (2013.01)
USPC ........... 701/411; 701/412; 701/417; 701/410; 701/428

(58) Field of Classification Search
CPC .................................................. G01C 21/3658
USPC .......................... 701/411, 412, 417, 410, 428
See application file for complete search history.

(56) References Cited

U.S. PATENT DOCUMENTS

| | | | | |
|---|---|---|---|---|
| 6,295,503 | B1 * | 9/2001 | Inoue et al. .................... | 701/410 |
| 8,655,585 | B2 * | 2/2014 | Machino ....................... | 701/454 |
| 2007/0050134 | A1 | 3/2007 | Hayashida et al. | |
| 2008/0249710 | A1 | 10/2008 | Takada | |
| 2010/0292916 | A1 * | 11/2010 | Kurciska et al. .............. | 701/201 |
| 2011/0166781 | A1 * | 7/2011 | Irie et al. ....................... | 701/201 |

\* cited by examiner

*Primary Examiner* — Mary Cheung
*Assistant Examiner* — Brian P Sweeney
(74) *Attorney, Agent, or Firm* — Posz Law Group, PLC

(57) ABSTRACT

A vehicle navigation system disposed in a vehicle executes a route guidance function that calculates a first route by prioritizing a special lane over a normal lane as a route calculation condition and performs route guidance when a special lane use option is turned on. A determination unit determines whether the vehicle is traveling in a parallel route section in which the special lane and normal lane are in parallel. If the vehicle is traveling in the parallel route section, a second route calculation unit calculates a second route towards the destination based on an assumption that the vehicle is traveling in the normal lane. In addition, a second route guidance unit outputs a second guidance phrase at a second guidance point, such that the second guidance phrase includes a conditional phrase that conveys that the vehicle is not in the special lane.

10 Claims, 8 Drawing Sheets

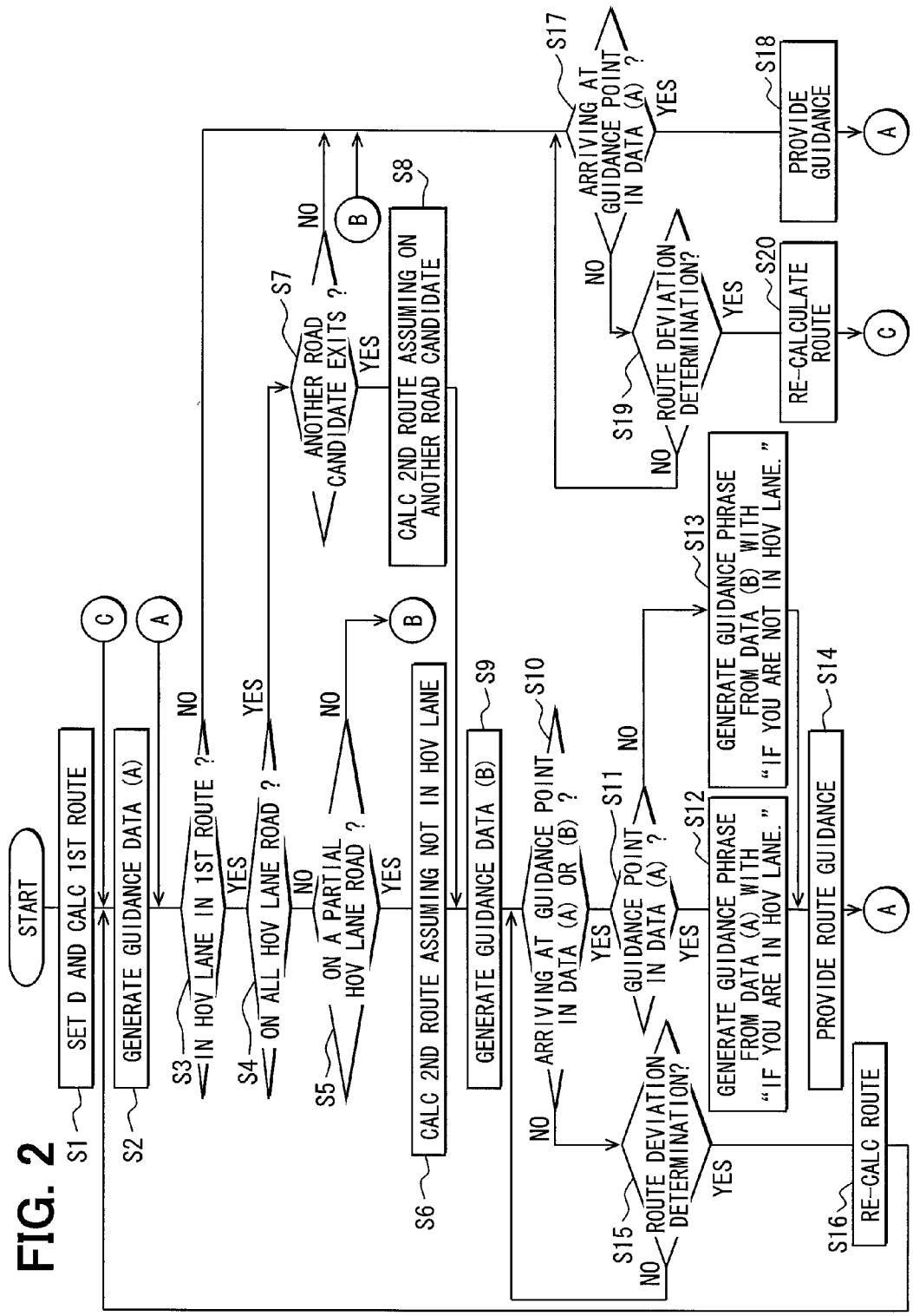

GUIDANCE DATA (A)
T1 - Right turn onto HWY-1
T2 - Keep left onto HWY-1-HOV LANE
T3 - Keep left onto HWY-2-HOV LANE
T4 - Take the exit from HOV LANE
T5 - Take the exit
T6 - Right turn
T7 - Your destination is ahead on the left GUIDANCE DATA (B)
T11 - Keep right onto HWY-2
T12 - Take the exit
T13 - Right turn
T14 - Your destination is ahead on the left

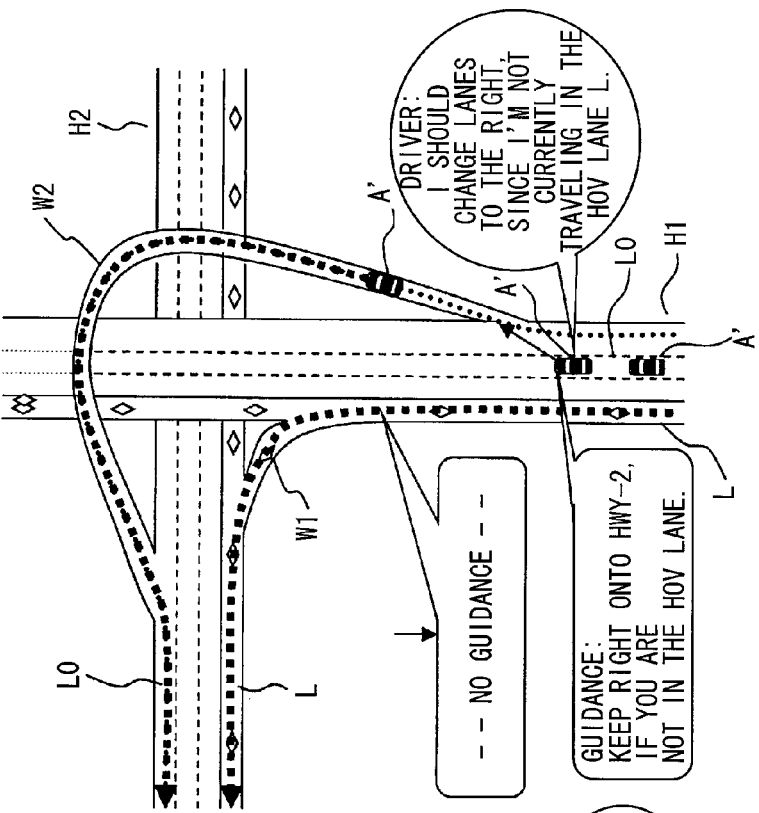
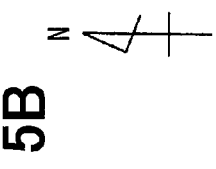
FIG. 5A
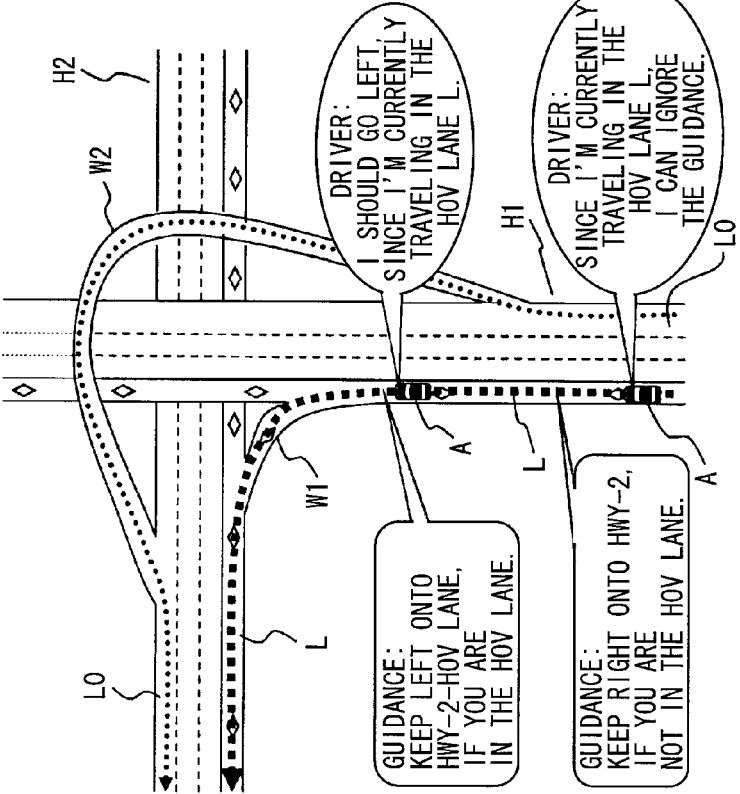
FIG. 5B

VEHICLE NAVIGATION SYSTEM

CROSS REFERENCE TO RELATED APPLICATION

The present application is based on and claims the benefit of priority of Japanese Patent Application No. 2012-23967, filed on Feb. 7, 2012, the disclosure of which is incorporated herein by reference.

TECHNICAL FIELD

The present disclosure generally relates to a vehicle navigation system that detects a current position of a vehicle and provides route guidance towards a specified destination.

BACKGROUND

A conventional navigation system used in a vehicle is equipped with a location function that detects a current position of the vehicle by using a position detector and displays the position detected on a screen of a display unit together with a map. Further, such navigation system is also equipped with a route guidance function that provides route guidance by searching a recommended route to a user-specified destination and by notifying the recommended route by voice or by graphic. The current position of the vehicle is detected and determined based on information regarding an absolute position from GPS signals, detection signals from a vehicle speed sensor, an angular velocity sensor, and by estimating a travel locus of the vehicle and by matching such locus with road map data.

A navigation apparatus of Japanese patent No. 4,645,516 (JP '516) discloses a special lane on a road, which is designated either as a high occupancy vehicle (HOV) lane or a carpool lane. A vehicle is allowed to travel in the HOV lane only when the vehicle is occupied by a predetermined number of occupants or more, thereby encouraging a shared use of vehicles and reducing the total number of vehicles on the road. If the vehicle is not occupied by the predetermined number of occupants when traveling in the HOV lane, the driver of the vehicle is fined. The HOV lane is thus less congested than other lanes, allowing compliant vehicles to travel faster for reaching the destination.

Further, though the HOV lane may be structured as a different road from other roads, the HOV lane may sometimes be an adjacent lane of a normal lane of the same road, with two parallel-running normal and HOV lanes simply divided by a division line (i.e., a lane mark) or by a guardrail. Even when the HOV lane is divided by the lane mark, entering into the HOV lane or exiting from the HOV lane from/to the normal lane may only be allowed at a predetermined road section (e.g., an access permit section). The HOV lane may be distinguished from the normal lane of the road by, for example, a diamond shape paint on the road (i.e., a road mark) or a road sign standing beside the road.

When the route guidance is provided by the vehicle navigation system, the user (i.e., a driver) may set an HOV option of the navigation system for using the HOV lane, if the number of occupants satisfies an HOV lane use condition. In such manner, the navigation system automatically takes into consideration (i.e., into calculation of the guidance route) the HOV lane whenever the HOV lane is available as the route guidance, for providing an appropriate guidance for smooth entrance into the HOV lane and for smooth exit from the HOV lane as required.

The vehicle may, however, travel in the normal lane for some reason, even when the navigation system is capable of providing an HOV lane considered route guidance. In such a situation, the following problem may be experienced.

FIGS. 8A and 8B illustrate a situation where a vehicle A and a vehicle A' are respectively traveling along a highway (i.e., northbound highway H1) towards a junction to enter another highway (i.e. westbound highway H2). The northbound highway H1 has four lanes with an HOV lane L on the left-most side and the other three lanes L0 serving as normal lanes. The westbound highway H2 also has four lanes with an HOV lane L on the left-most side and the other three lanes L0 serving as normal lanes. When the vehicles A and A' receive guidance for transitioning from the northbound traffic (i.e., an arrow "a") of H1 to the westbound traffic (i.e., an arrow "b") of H2, the following problem may occur.

With reference to FIG. 8A, if the vehicle A is actually traveling in the HOV lane L, with the route guidance instructing the travel of the HOV lane L, the vehicle A can branch from the left-most HOV lane L of H1 to the left-most HOV lane L of H2 through an HOV lane dedicated ramp W1 as indicated by a thick broken arrow line. The route guidance of such transit may sound like "Keep left onto HWY-2" at a preset point before the ramp W1.

However, with reference to FIG. 8B, if the vehicle A' is traveling in one of the normal lanes L0, such as the second lane from the right, the vehicle A' cannot change lanes from the normal lane L0 to the HOV lane L at a guidance provision timing when the route guidance of "Keep left onto HWY-2" is provided at a preset point before the ramp W1. Thus, the driver may have to pass the junction and then turn around to try to enter H2.

When the vehicle A' is traveling in the normal lane L1, the vehicle A' should receive the route guidance, which guides the vehicle A' to enter the right-most lane L0 of H1 to branch off to the right-most lane L0 of H2 through a normal lane ramp W2, as shown by a thick broken arrow line in FIG. 8B. The route guidance in such case should sound like "Keep right onto HWY-2" at a preset point before the ramp W2.

Therefore, the navigation system may preferably determine whether the vehicle is traveling in the HOV lane or in the other lane (i.e., the normal lane) for the purpose of providing an appropriate route guidance that uses, as a guidance route, a road having the HOV lane. However, the position detector of the current navigation system may not be able to detect each of the lanes on the road due to a relatively large amount of error of the detector.

Therefore, in JP '516, whether the vehicle is traveling in the HOV lane is detected by capturing a road sign or a road mark with the in-vehicle camera and by performing image recognition for the captured image. Accordingly, in addition to the normal position detector of the navigation system, the determination of the travel of the vehicle in the HOV lane may only be possible with a special device that captures an image and recognizes the captured image.

SUMMARY

In an aspect of the present disclosure, a vehicle navigation system includes: a first route calculation unit, a first route guidance unit, a determination unit, a second route calculation unit, and a second route guidance unit.

The first route calculation unit calculates a first route between a start point and a destination based on a route calculation condition that prioritizes a special lane over a normal lane for travel to the destination. Based on the first route, the first route guidance unit outputs a first guidance phrase at a first guidance point as route guidance. In such manner, the user is provided appropriate route guidance for travel along an appropriate route, which prioritizes the special lane.

During the travel of the vehicle, the determination unit may determine that the vehicle is traveling in a parallel route section where the special lane and the normal lane run in parallel based on a current position of the vehicle detected by a position detector. As a result, the second route calculation unit calculates a second route optimally from the current position to the destination based on an assumption that the vehicle is traveling in the normal lane.

Accordingly, the second route guidance unit outputs a second guidance phrase at a second guidance point, as route guidance, based on the second route. At the time of providing the second route guidance, an additional phrase conveying a condition that the vehicle is not traveling in the special lane is added to the second guidance phrase, and such route guidance having the additional phrase is outputted at the second guidance point.

In such manner, even when the vehicle is traveling in the normal lane along the parallel route section, the second route guidance unit outputs, at the second guidance point, an appropriate route guidance for the vehicle traveling in the normal lane. In such route guidance, a conditional guidance phrase conveying that the vehicle is not in the special lane, such as "if NOT in a special lane", is outputted. Thus, suggesting to the driver of the vehicle to simply disregard such route guidance if the vehicle is traveling in the special lane.

According to the present disclosure, an appropriate guidance is provided for the vehicle traveling in either of the special lane or the normal lane. Further, the vehicle navigation system is only required to determine a rough position of the vehicle in order to determine whether the vehicle is traveling in the parallel route section where the special lane and the normal lane run in parallel. Therefore, the vehicle navigation system does not require an accurate determination as to whether the vehicle is traveling in the special lane or the normal lane by employing a special device.

BRIEF DESCRIPTION OF THE DRAWINGS

Other objects, features and advantages of the present disclosure will become more apparent from the following detailed description disposed with reference to the accompanying drawings, in which:

FIG. 2 is a flowchart of a route guidance process performed by a control unit of the vehicle navigation system;

FIGS. 5A and 5B are illustrations of junction guidance for the HOV lane and for a normal lane;

DETAILED DESCRIPTION

An embodiment of the present disclosure is described in the following with reference to FIG. 1 to FIG. 7.

Figure 1:
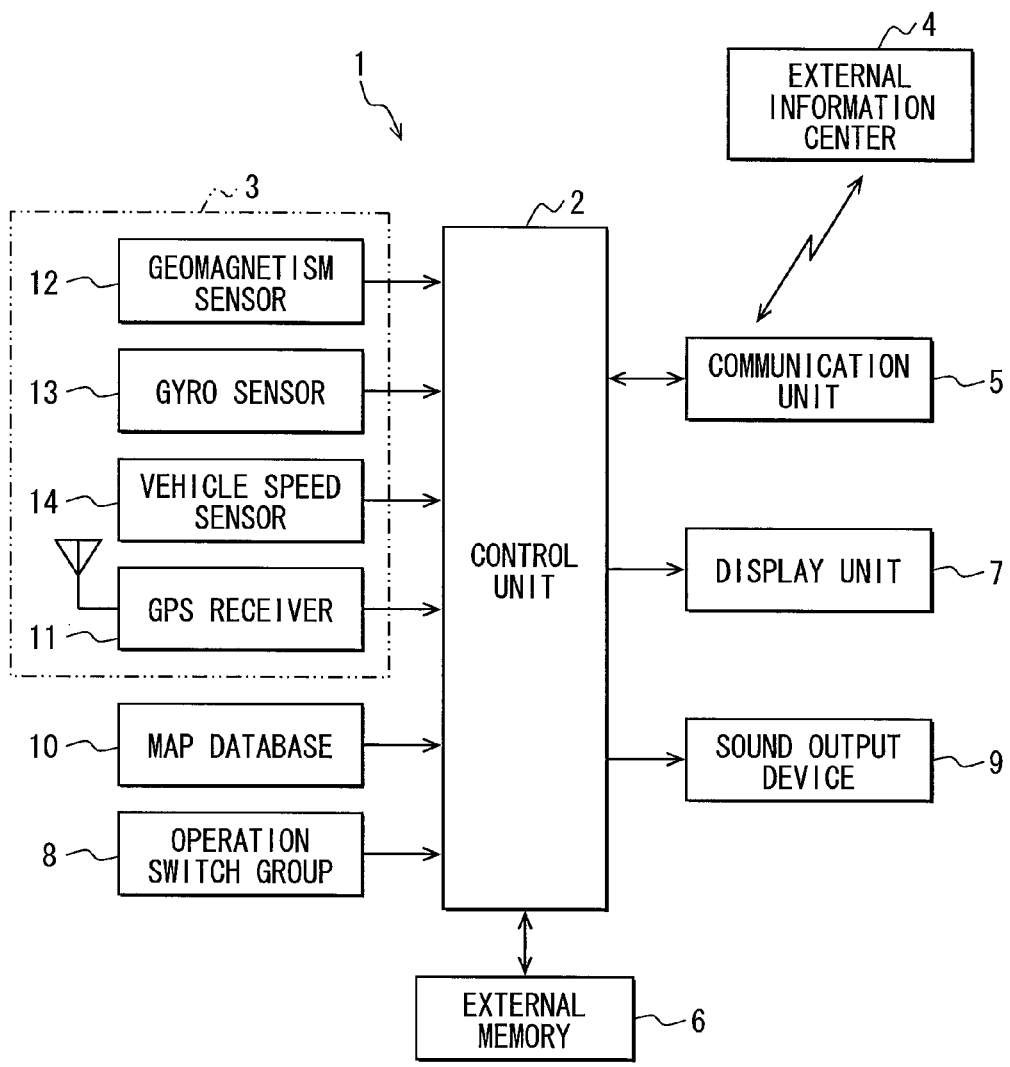
FIG. 1 is a block diagram of a vehicle navigation system disposed in a vehicle of the present disclosure.

FIG. 1 shows a block diagram of a vehicle navigation system 1 that is installed in a vehicle or the like.

The vehicle navigation system 1 includes a control unit 2 that is provided as a computer (i.e., a CPU) for controlling the system 1. The system 1 further includes other components connected to the control unit 2, such as a position detector 3, a communication unit 5, an external memory 6, a display unit 7, an operation switch group 8, a sound output device 9, and a map database 10.

The position detector 3 serves as a position sensing device for detecting a position of the vehicle. The communication unit 5 performs wireless communication with an external information center 4. The display unit 7 may be provided as a full-color liquid crystal display to serve as a display device. The operation switch group 8 includes a touch panel and/or a mechanical switch, and the sound output device 9 outputs a synthesized sound from a speaker.

The position detector 3 includes a Global Positioning System (GPS) receiver 11 for implementing a GPS to detect a current position of the vehicle based on an electric wave from a GPS satellite. The position detector 3 also include a geomagnetism sensor 12, a gyro sensor 13, and a vehicle speed sensor 14.

Based on an input from each of the sensors 11 to 14, which make up the position detector 3, the control unit 2 detects the current position of the vehicle by using software and hardware as well as detecting a travel direction, a speed, a travel distance, and a current time in a highly accurate manner.

Further, the control unit 2 realizes a location function that displays, on the screen of the display unit 7, the current position and the travel direction of the vehicle superposed on a road map around such current vehicle position based on the detected vehicle position and the map data from the map database 10. For realizing the location function, the map matching process for estimating the current vehicle position is performed, which is used to display the current position of the vehicle on a currently-traveling road on an electric road map based on a comparison between the travel locus of the vehicle and the road shape in the map data in consideration of the errors of the data.

Figure 7A:
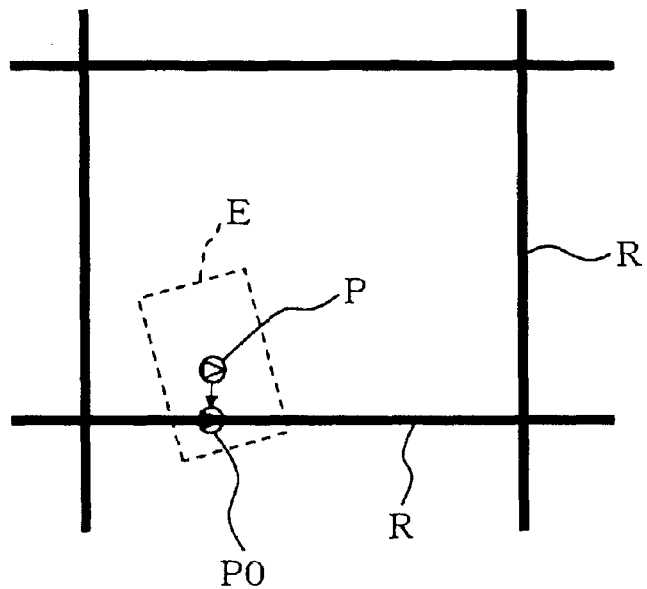
FIGS. 7A, 7B, and 7C are illustrations of a travel road identification method based on a detection of a position of the vehicle.
Figure 7B:
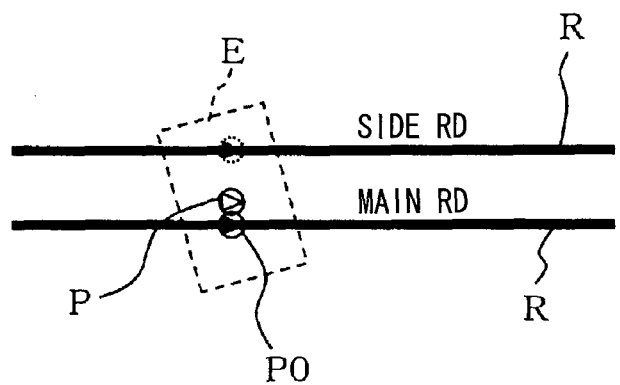
Figure 7C:
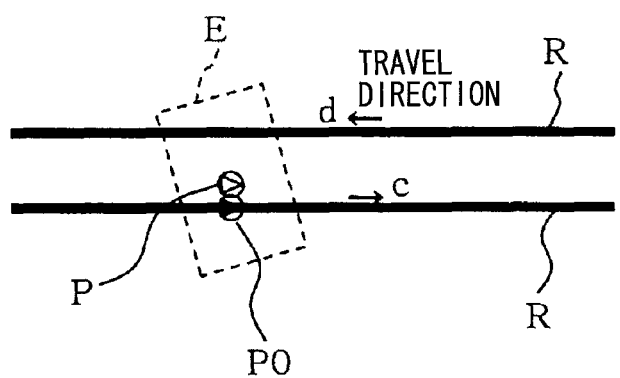
Figure 8A:
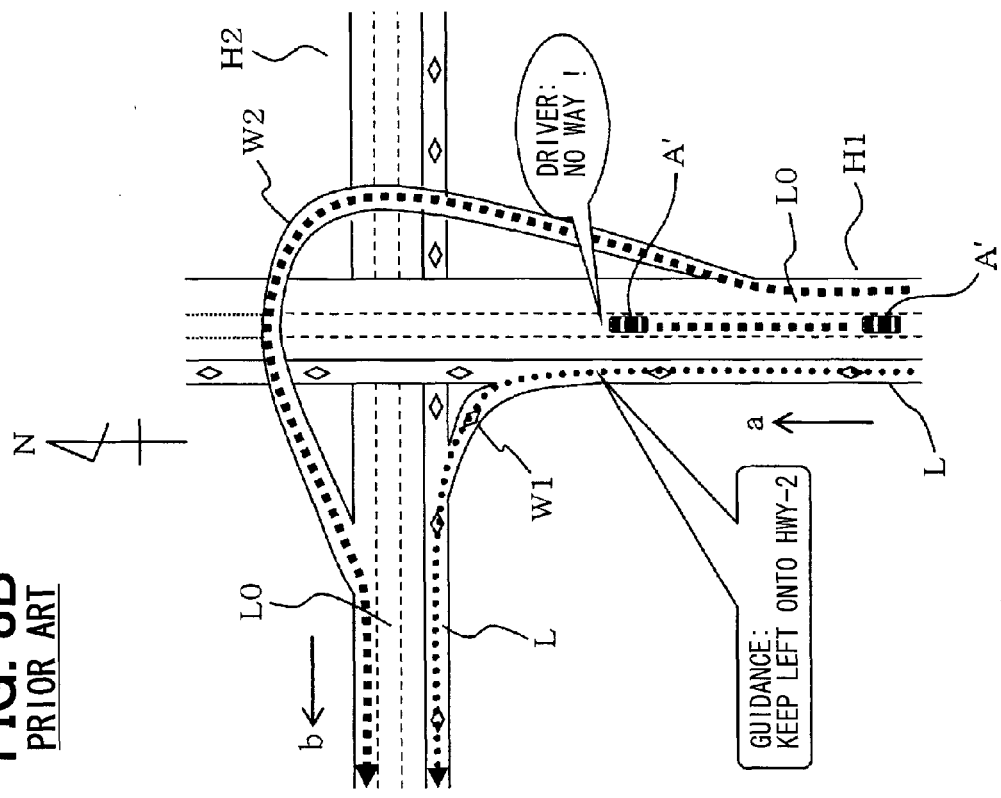
FIGS. 8A and 8B are illustrations of a prior art technique for route guidance provided for a road including the HOV lane.
Figure 8B:
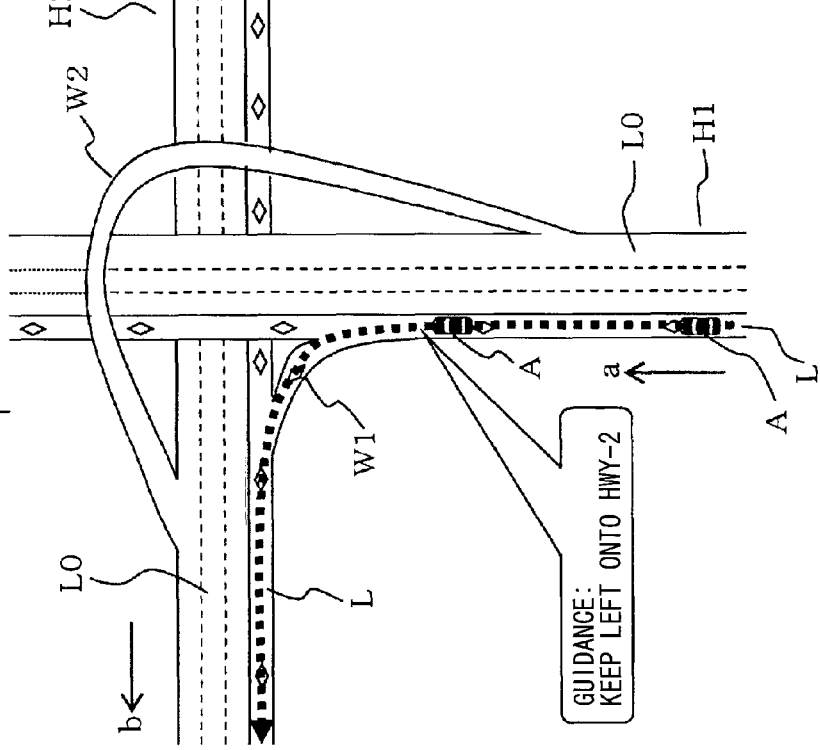

With reference to FIGS. 7A to 7C, map matching for identifying a road in which the vehicle is traveling (i.e., a currently-traveling road) is briefly described.

A position P of the vehicle detected by the position detector 3 includes an error range E defined as a rectangular area that extends, for example, in east-west and north-south directions. To identify the road along which the vehicle is traveling, road candidates are extracted as roads included in the error range E from among roads R in the road map data, which are illustrated as thick lines in FIG. 7A. The illustration of FIG. 7A shows an example of an urban area having multiple roads formed as a parallel grid with a relatively large distance disposed therebetween. In this case, there is only one road candidate included in the error range E, thereby enabling a current position P0 to be identified as a position along such road.

FIG. 7B depicts a situation of having two roads R running in parallel (i.e., side by side) with a narrow gap. In this case, both of the two roads R, one of which is a main road and the other is a side road, are included in the error range E, causing both of the two roads R to be serving as road candidates. Therefore, even though the currently-traveling road (i.e., the current position P0) is temporarily identified as one of the two roads R (i.e., the current position P0 is identified as on one of the two roads R), both of the two roads R are evenly treated as candidates, in order not to exclude a possibility that the vehicle is actually traveling on the other one of the two roads R (i.e., multiple candidates case, considering two or more roads evenly as "another candidate" of the currently-traveling road).

However, if additional information, such as a traveling direction of the vehicle and the traffic direction of the roads R indicated as arrows c, d in FIG. 7C are available from the position detector 3, the two candidates in the error range E may be narrowed to only one candidate to identify the current position P0 of the vehicle.

With continuing reference to FIG. 1, the map database 10 may store the map data for all the roads in the country in which the system 1 is used, for example, the United States. In addition to the map data, data regarding various facilities and shops are also stored. Information regarding the roads may be stored in a topology of the road as a network of nodes and links. In other words, the roads along the map are basically represented with a node that represents an intersection and a link that connects two nodes, with link ID and other attributes such as position (i.e., latitude, longitude), angles (i.e., traffic directions), road widths, and road types assigned specifically to each of the links. Further, drawing data for drawing a road map on the screen of the display unit 7 is also stored in the database 10.

Among various kinds of roads, the highways may have a normal lane and a high occupancy vehicle (HOV) lane or a carpool lane, which are special lanes for vehicles occupied by more than predetermined number of occupants. If the vehicle is not occupied by the predetermined number of occupants when traveling in the HOV lane, the driver of the vehicle may be fined. The HOV lane may be less congested than other lanes, allowing compliant vehicles to travel faster for reaching the destination.

Figure 6A:
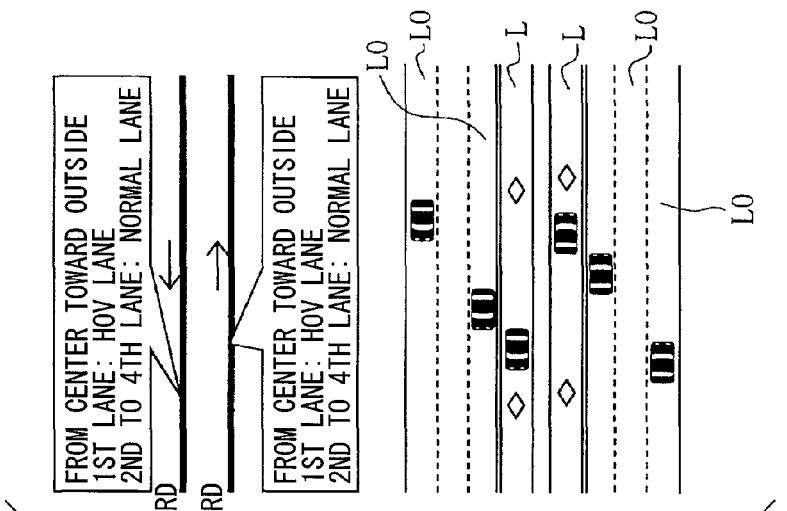
FIGS. 6A, 6B, and 6C are illustrations of a HOV lane description in road map data.
Figure 6B:
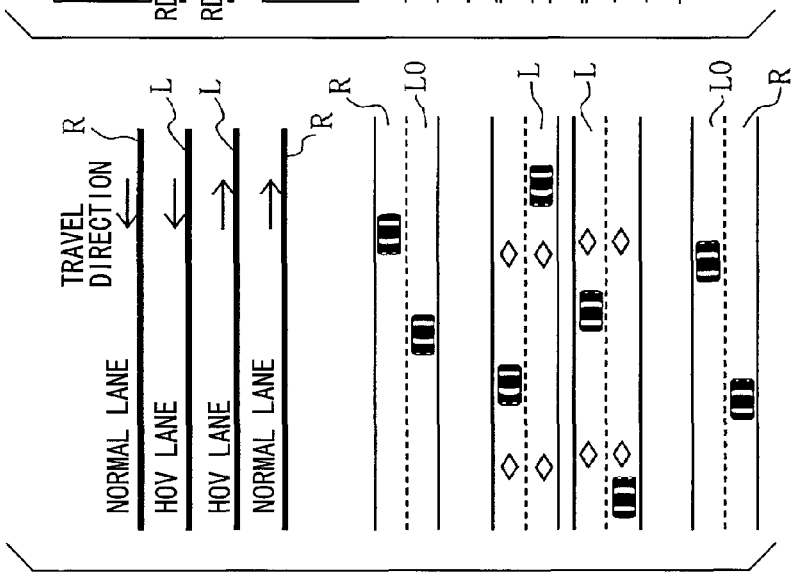
Figure 6C:
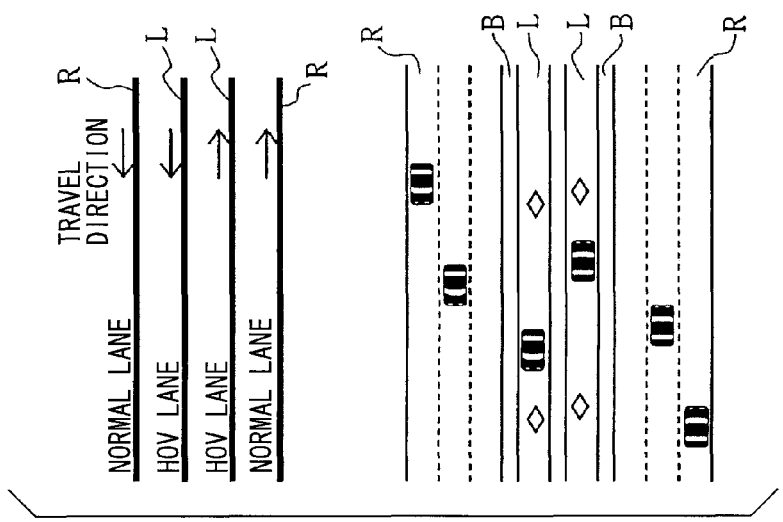

The HOV lane may be structured as a different road from other roads or may be divided from other lanes by a guardrail. For instance, as shown in FIG. 6A, the HOV lane L is in parallel with three normal lanes of a road R is divided from the normal lanes by a barrier B. In FIG. 6B shows another example in which each of the two-way traffic directions has a road having two HOV lanes L and a road R having two normal lanes L0. In FIG. 6C shows an example in which each of the two-way traffic direction is a road R that has four lanes and has lane marks to divide one HOV lane L and three normal lanes L0.

In the case of FIG. 6A, the HOV lane L in the road map data is described as a separate structure from the road R having three normal lanes L0, which is indicated in the description of the road attribute as the HOV lane L. In FIG. 6A, transition between the normal lane L0 and the HOV lane L in the illustrated section of the road is impossible. In the case of FIG. 6B, the road R is naturally described as a different structure from the road that has all lanes used as the HOV lanes.

In contrast, in case of FIG. 6C, the road R is described as a normal road structure, with the road attribute indicating that a part of the road (e.g., one inner lane from among four lanes) is used as the HOV lane L.

In either case, exiting from one lane to enter the other lane, for example, from the normal lane L0 to the HOV lane L, may be allowed only in the access permit section. The HOV lane may be distinguished from the normal lane L0 by, for example, a diamond shape paint on the road surface or a road sign beside the road.

With continuing reference to FIG. 1, the vehicle navigation system 1 communicates with a server of the information center 4 by using the communication unit 5 through a radio station or a communication network such as the Internet. By such communication, traffic information, such as a traffic jam, an accident, a construction, lane/road closure, as well as weather information, such as wind direction, road surface conditions, and information regarding point of interest (POI), such as facilities and shops, are received and stored in the system 1. The communication unit 5 may be implemented as a device such as a cellular phone, a DSRC device, and a wireless LAN device.

Further, the vehicle navigation system 1 performs a route guidance function that includes a route search that searches for a recommended route from a start point (i.e., a current position) to a destination set by the user and a route guidance for guiding the user through the recommended route provided by the route search, which is implemented as a route search-guide program executed by the control unit 2.

While inputting the destination, the user may operate the operation switch group 8 to input from the setting screen whether he/she would like to use the HOV lane. The operation switch group 8 may serve as a setting unit in claims.

A well-known Dijkstra method may be used for the route search by finding a minimum cost route from the start point (i.e., the current position) to the destination based on the node and link data in the database 10, which assigns a link cost for each link in the road map data. Specifically, by sequentially adding the link cost (i.e., an evaluation value) for various searched routes, the minimum cost route is determined as the recommended route as a series of links and nodes (i.e., the roads and the intersections). The route search may additionally consider the traffic information and/or the weather information. In the course of such consideration, if the HOV lane consideration is also indicated as a search condition setting, the HOV lane is prioritized over the normal lane for the road section where the HOV lane runs in parallel with the normal lane. The details of such calculation of a first route (i.e., a first guidance route) are described later.

When the route guidance is provided, the guidance route is displayed as a route to be traveled by the vehicle on the road map using a different color from other roads on the screen of the display unit 7. In addition, intersection guidance shows an expanded map and a travel direction regarding an approaching intersection.

The graphical route guidance may also be accompanied by a guidance sound from a speaker of the sound output device 9, which may be output when the current position of the vehicle comes to a certain point before a guidance intersection. For example, when the right or left turn guidance is provided at an intersection, the guidance sound may be provided first, as a prior notice, well before the guidance intersection, and may be a sound uttering, for example, "Right turn 300 meters ahead". In addition, immediately before the guidance intersection, the guidance sound may be provided as a sound uttering "Turn right shortly", together with the graphical route guidance on the screen of the display unit 7.

In the present embodiment, the route guidance function by the control unit 2 guides the HOV lane used route as the first route, which is a recommended guidance route, from the start point to the destination when the HOV lane use setting is turned on and when the normal lane runs in parallel with the HOV lane. The control unit 2 then generates a first guidance data for providing the first route as the guidance route. This guidance data includes guidance phrase data for the first route and guidance position data defining guidance points. The guidance position data provides the positions at which the guidance phrase is to be outputted via, for example, sound.

Further, the control unit 2 performs the route guidance based on the first guidance data generated in the above-described manner. The route guidance is performed by outputting a first guidance phrase in a synthesized voice from the sound output device 9 together with the graphical route guidance from the screen of the display unit 7 when the vehicle arrives at a first guidance point. The control unit 2 may serve as a first route calculation unit and a first route guidance unit in claims.

The control unit 2 performs a process, which is described later, as a software configuration at a time of executing the route guidance function. Specifically, when the first route is provided as a route guidance in the present embodiment.

First, the control unit 2 continuously determines whether the vehicle is traveling a parallel route section where the normal lane runs in parallel with a special lane at a time of providing the first route as a route guidance. When it is determined that the vehicle is traveling in a parallel route section, a second route from the current position to the destination is calculated as an optimum route based on an assumption that the vehicle is traveling in a normal lane.

The control unit 2 generates a second guidance data that includes a second guidance phrase for route guidance along the second route and a second guidance point. Furthermore, the control unit 2 performs the route guidance based on the second guidance data generated with an additional guidance phrase included in the second guidance phrase that adds a condition, such as "If you are NOT in the HOV lane", at the second guidance point. The control unit 2 may serve as a determination unit, a second route calculation unit and a second route guidance unit in the claims.

Further, the control unit 2 outputs an additional phrase added to the first guidance phrase at the first guidance point when the vehicle arrives at the first guidance point while it is determined that the vehicle is traveling in the parallel route section.

The control unit 2 determines that the vehicle is traveling in the parallel route section when the currently-traveling road detected by the position detector 3 is a road that is formed as an all-special-lane road (FIGS. 6A and 6B) and another road candidate that has at least one normal lane included therein exists in proximity to the currently traveling road. Alternatively, the control unit 2 may also determine that the vehicle is traveling in the parallel route section, when the currently-traveling road detected by the position detector 3 is a road that is formed as a mix-lane road having both the normal lane and the special lane (FIG. 6C).

Figure 3A:
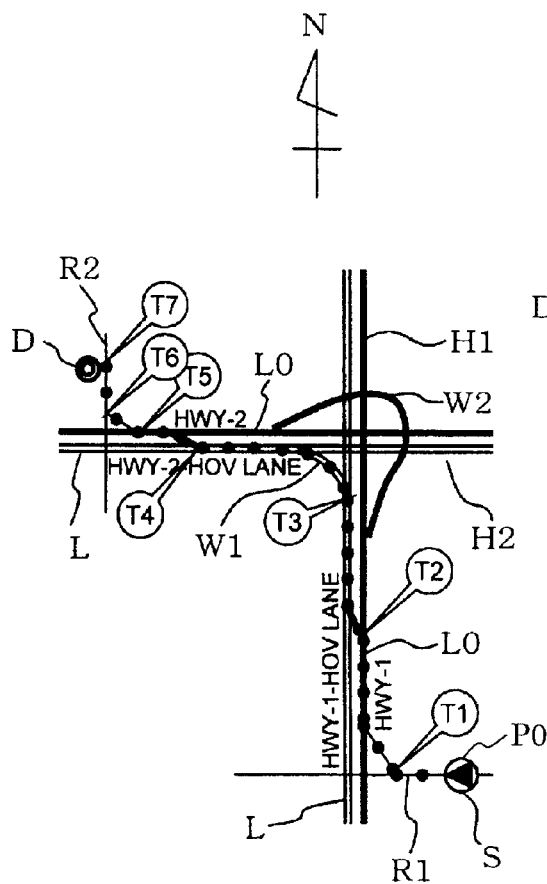
FIGS. 3A and 3B are illustrations of a first and a second guidance data.

With reference to FIG. 3A, a route from a start point S at the lower right position to a destination D at the upper left position is illustrated. Further, in illustration of the roads in FIGS. 3A to 5B, the upper side of the illustration is considered as north.

As shown in FIG. 3A, the illustrated route starts from the point S to go left (i.e., west) on a local road R1, to enter from an entrance onto a northbound highway H1. With reference to FIGS. 4, 5A, and 5B, which are expanded view, the highway H1 has four lanes, with the left-most lane designated as the HOV lane L, which is shown as a double line in FIGS. 3A and 3B, and the other three lanes designated as the normal lanes L0, which are shown as a thick line in FIGS. 3A and 3B.

Further, a westbound highway H2 crosses with the highway H1 at a junction. The highway H2 also has four lanes, with the left-most lane designated as the HOV lane L, which is shown as a double line in FIGS. 3A and 3B, and the other three lanes designated as the normal lanes L0, which is shown as a thick line in FIGS. 3A and 3B. The junction has a dedicated HOV lane ramp W1 branching from the HOV lane L of the highway H1 and merging with the HOV lane L of the highway H2. There is also a normal lane ramp W2 in the same junction branching from the right-most normal lane L0 of the highway H1 and merging with the right-most normal lane L0 of the highway H2.

Accordingly, to change from the first road (i.e., H1) to the second road (i.e., H2), the vehicles A, A' may take one of the two routes illustrated as thick broken lines in FIG. 4. The vehicle A may branch to the left from the HOV lane L of H1 through the ramp W1 to merge with the HOV lane L of H2. Whereas, the vehicle A' may branch to the right from the normal lane L0 of H1 through the ramp W2 to the right-most normal lane L0 of H2, with an approach to the ramp W2 required to be in the right-most normal lane L0. In such a case, the branch portion of the ramp W1 and the branch portion of the ramp W2 are distantly positioned in terms of the northbound traffic of the highway H1, positioning the branch portion of the ramp W2 before the branch portion of the ramp W1.

With continuing reference to FIG. 3A, the illustrated route goes left (i.e., west) on the highway H2 and turns right from an exit onto a northbound local road R2, which is towards the destination D.

The control unit 2 provides route guidance based on the user's input and execution, via the operation switch group 8, of the guidance function and the destination D. In addition, the user sets the use of the HOV lane L when the vehicle has at least a predetermined number of occupants. The flowchart in FIG. 2 describes the details of the guidance process.

At S1, the control unit 2 sets the destination D, and performs a route calculation for calculating the first route, which is a recommended route from the start point S (i.e., the current position) to the destination D. At S2, the control unit 2 generates the first guidance data (i.e., "guidance data (A)" hereinafter). When the setting for using the HOV lane is turned on, the control unit 2 uses the HOV lane L in a prioritized manner for calculating the first route.

In an example of FIG. 3A, the first route goes west on the local road R1 from the start point S, which is the current position P0 of the vehicle, enters the highway H1 from an entrance interchange, and goes north to enter the HOV lane L from a nearest entrance. The first route then stretches along the HOV lane L of the highway H1 and exits onto the ramp W1 to enter the HOV lane L of the highway H2. Next, the first route goes west along the HOV lane L of the highway H2, exits to the normal lane L0 before an exit interchange, exits the highway H2 at the exit interchange to turn right onto the local road R2, and goes north to the destination D.

According to the first route, the guidance data A guides the vehicle through the first route. For instance, when the vehicle arrives at a guidance point T1 before the entrance interchange, the guidance phrase may be provided as "Right turn onto HWY-1." When the vehicle goes north along the highway H1 to a guidance point T2 before an entrance of the HOV lane L, the guidance phrase may provided as "Keep left onto HWY-1-HOV LANE."

When the vehicle arrives at a guidance point T3 that is positioned at a predetermined distance before the ramp W1, the guidance phrase may be provided as "Keep left onto HWY-2-HOV LANE." When the vehicle arrives at a guidance point T4 that is positioned before an HOV lane exit of the HOV lane L, which is positioned before an exit interchange of the highway H2, the guidance phrase may be provided as "Take the exit from HOV LANE." Further, the predetermined distance described above should be determined as a constant distance. Further, the predetermined distance may be calculated in advance based on the current vehicle speed and a predetermined time length.

When the vehicle arrives at a guidance point T5 before the exit interchange of the highway H2, the guidance phrase may be provided as "Take the exit." When the vehicle arrives at a guidance point T6 after exiting from the exit interchange, the guidance phrase may be provided as "Right turn." When the vehicle arrives at a guidance point T7 just before the destination D, the guidance phrase may be provided as "Your destination is ahead on the left."

With continuing reference to FIG. 2, the control unit 2, at S3, determines whether the currently-traveling lane of the road is a HOV lane L. Specifically, the control unit 2 determines that the vehicle is currently in the HOV lane L when the currently-used guidance data for guiding the first route is the guidance data for the HOV lane L. In particular, the position detector 3 cannot detect the lane of the currently-traveling road that has both of the normal lane L0 and the HOV lane L running in parallel, which is the case for the highways H1 and H2.

In the example of FIG. 3A, it is determined that the vehicle is not traveling in a HOV lane L during a travel along the local road R1, the highway H1 before entering the HOV lane, the highway H2 after exiting the HOV lane of the highway H2, and the local road R2. In other sections of the highways H1, H2, the vehicle in FIG. 3A is determined as traveling in the HOV lane L.

If the vehicle is not traveling in the HOV lane L, that is, the currently-used guidance data is not the guidance for the HOV lane (S3: No), the control unit 2 determines whether the vehicle arrives at the guidance point in the guidance data (A) at S17. If the vehicle has arrived at the guidance point (S17: Yes), the control unit 2 performs the route guidance at S18, and then returns to S3.

In the example of FIG. 3A, upon arriving at the guidance point T1, the guidance phrase "Right turn onto HWY-1" is provided as, for example, a sound and message displayed on the display unit 7. In such manner, the driver may enter the highway H1. Upon arriving at the next guidance point T2, the guidance phrase of "Keep left onto HWY-1-HOV LANE." is provided. In such manner, the driver may enter the HOV lane L from an HOV lane entrance.

Further, upon arriving at the guidance point T6, the guidance phrase of "Right turn." is provided. In such manner, the driver may exit the highway H2 onto the road R2. Then, upon arriving at the guidance point T7, the guidance phrase of "Your destination is ahead on the left." is provided, and the driver may understand that the vehicle has arrived at the destination D.

With continuing reference to FIG. 2, if the vehicle has not arrived at the guidance point (S17: No), the control unit 2 performs a route deviation determination at S19 to determine whether the vehicle has deviated from the route. If the vehicle has not deviated from the route (S19: No), the control unit 2 returns to S17. If the vehicle deviated from the route (S19: Yes), the control unit 2 re-calculates the route from the current position to the destination D (i.e., a new first route) at S20, and returns to S2 to generate the guidance data (A) for the new first route.

In contrast, if the vehicle is traveling the HOV lane L, that is, the currently-used guidance data is for the guidance of the HOV lane of the first route (S3: Yes), the control unit 2 determines whether all the lanes of the currently-traveling road are the HOV lanes L at S4 (i.e., special lanes). If it is determined that not all the lanes of the currently-traveling road are the HOV lanes L (i.e., special lanes) (S4: No), the control unit 2 determines whether a part of the lanes of the currently-traveling road is the HOV lane at S5 (i.e., whether the currently-traveling road has both of the HOV lane L (i.e., a special lane) and the normal lane L0).

If a part of the lanes of the currently-traveling road is not the HOV lane L (S5: No), the control unit 5 proceeds to S17. If a part of the lanes of the currently-traveling road is the HOV lane L (S5: Yes), the control unit 2 determines that the vehicle is traveling in the parallel route section, and proceeds to S6. At S6, assuming that the vehicle is traveling in the normal lane L0, a second route optimally navigating from the current position to the destination D is calculated.

Further, at S4, if all of the lanes are the HOV lanes (S4: Yes), the control unit 2 determines whether another road candidate exists in proximity of the currently-traveling road, which at least has a normal lane, at S7. If no other road candidate exists (S7: No), the control unit 2 proceeds to S17. If another road candidate exists (S7: Yes), the control unit 2 proceeds to S8, based on the determination that the vehicle is traveling in the parallel route section. In S8, assuming that the vehicle is currently traveling in the normal lane of the other road candidate, the control unit 2 calculates the second route optimally navigating from the current position to the destination D.

In S9, the control unit 2 generates the second guidance data that includes the guidance phrase and the guidance points of the second route, which is designated as "guidance data (B)" hereinafter.

Figure 3B:
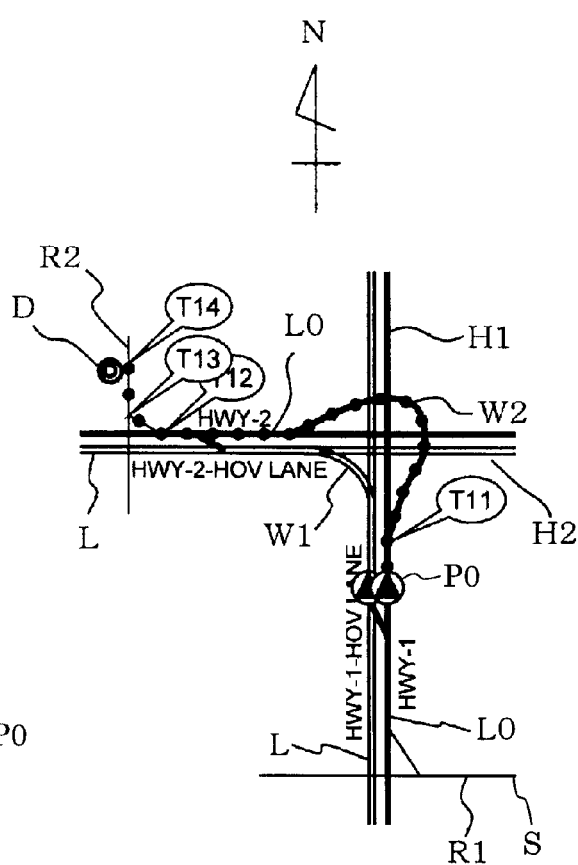
Figure 4:
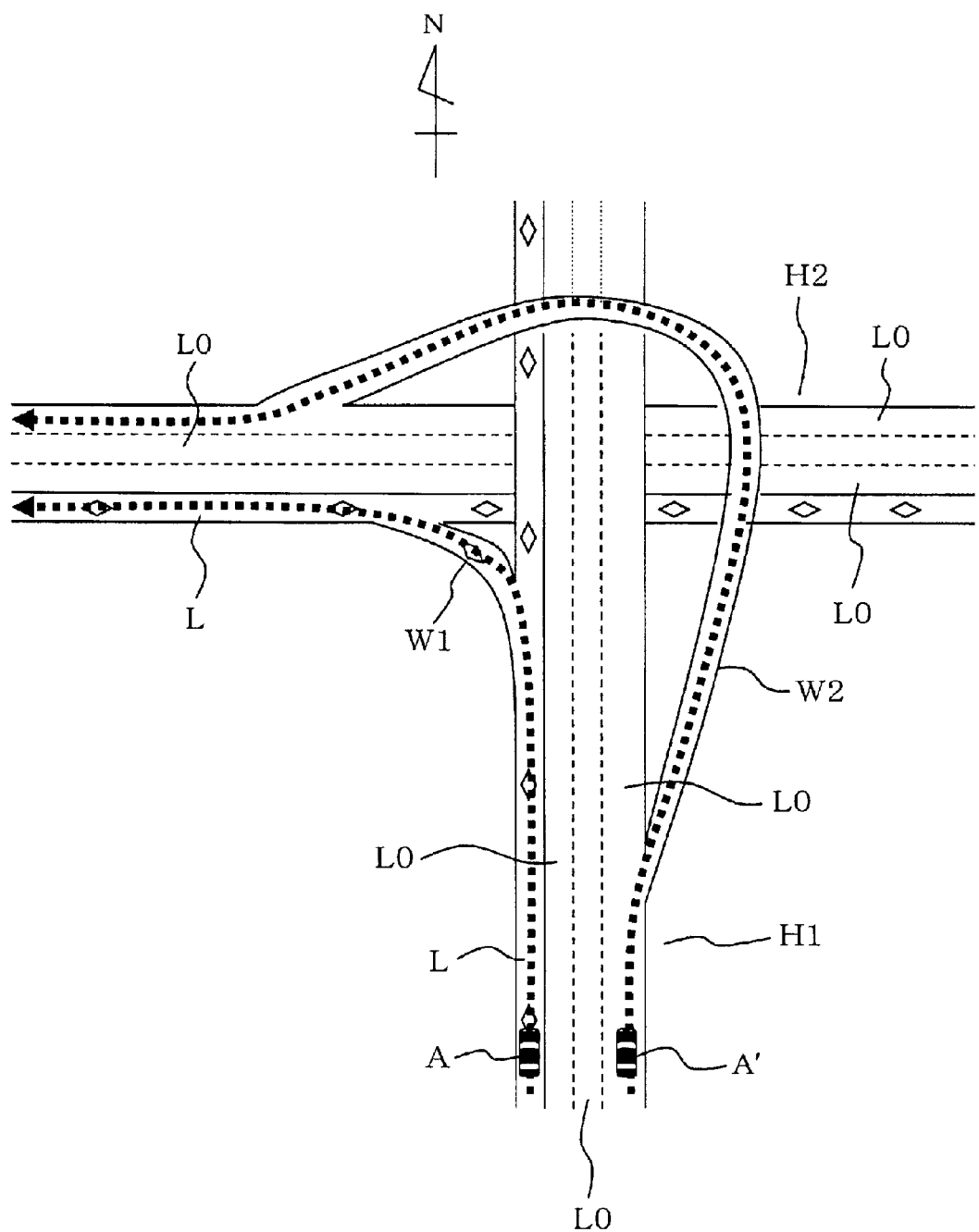
FIG. 4 is an illustration of a junction with an HOV lane included in a multiple lane road.

In an example of FIG. 3B, if the current position P0 of the vehicle is considered as a position after entering the HOV lane L, the control unit in S5 determines that the vehicle is traveling in the parallel route section when the vehicle is traveling in the HOV lane L, even when the vehicle is traveling in the normal lane L0. Thus, at S6, the second route toward the destination D is calculated based on an assumption that the vehicle is currently traveling in the normal lane L0.

The second route described above is, as shown by a thick line in FIG. 3B, a route going in the right-most lane of the highway H1, branching to the right through the ramp W2, and merging with the right-most normal lane of the highway H2. The second route then goes west to the exit interchange for exiting the highway H2 in the normal lane L0 since no HOV lane entrance is provided for that road section. Next, the second route, exits the highway H2 to turn right onto the local road R2, and then goes north to the destination D.

The guidance data (B) for the guidance of the second route may be generated as follows as shown in FIG. 3B. Upon arriving at a guidance point T11, the guidance phrase may be provided as "Keep right onto HWY-2." By outputting such guidance phrase, if the vehicle is traveling in the normal lane L0, the driver is prompted to keep on traveling in the right-most normal lane L0 of the highway H1 for merging with the normal lane L0 of the highway H2 via the ramp W2.

Further, upon arriving at a guidance point T12 the guidance phrase may be provided as "Take the exit." Subsequently, upon arriving at a guidance point T13, which is positioned outside of the exit interchange, the guidance phrase may be provided as "Right turn." Upon arriving at a guidance point T14, which is a position before the destination D, the guidance phrase may be provided as "Your destination is ahead on the left."

The guidance data for the guidance points T12 to T14 is the same data as the guidance data (A) for the guidance points T5 to T7.

With continuing reference to FIG. 2, the control unit 2 determines, at S10, whether the vehicle is arriving at one of the guidance points in the guidance data (A) or (B). If the vehicle is arriving at one of the guidance points (S10: Yes), the control unit determines, at S11, whether the guidance point is the point in the guidance data (A). If it is the guidance point in the guidance data (A) (S11: Yes), the control unit 2, at S12, adds the phrase "if you are in the HOV lane" to the guidance phrase of the guidance data (A), and then proceeds to S14.

On the other hand, if the guidance point is the guidance point in the guidance data (B) (S11: No), the control unit 2, at S13, adds the phrase "if you are NOT in the HOV lane" to the guidance phrase in the guidance data (B). The control unit 2 performs the route guidance at S14, and then returns to S3 after performing the route guidance.

Further, if the vehicle is not arriving at one of the guidance points (S10: No), the control unit 2 determines whether the vehicle has deviated from the route at S15 (i.e., route deviation determination). If the vehicle has not deviated from the route (i.e., from the first route) (S15: No), the control unit 2 returns to S10. If the vehicle has deviated from the first route (S15: Yes), the control unit 2 re-calculates the route from the current position to the destination D (i.e., the first route is re-calculated) at S16, and then returns to S2 to generate the guidance data (A) for the new first route.

With reference to FIGS. 3A, 3B, 5A and 5B, when the vehicle arrives at the guidance point T2 in the guidance data (A), the guidance phrase "Keep left onto HWY-1-HOV LANE" is provided first. When the vehicle reaches the guidance point T11 (i.e., at a point before the branch portion of the ramp W2), the guidance phrase "Keep right onto HWY-2, if you are NOT in the HOV lane." is provided (FIG. 5B).

When the vehicle A is traveling in the HOV lane L (FIG. 5A), the driver considers the guidance at T11 as irrelevant and performs no action (i.e., ignores) since the vehicle is currently traveling in the HOV lane L. Upon arriving at the guidance point T3 (i.e., at a point before the branch portion of the ramp W1) in the guidance data (A), the guidance phrase "Keep left onto HWY-2-HOV LANE, if you are in the HOV lane." is provided. In this manner, the driver can branch off to the left through the ramp W1 to enter the HOV lane L of the highway H2. Thereafter, the guidance for the guidance points T4 to T7 in the guidance data (A) is provided.

In contrast, as shown in FIG. 5B, the vehicle A' may, for some reason (e.g., based on the driver's decision), not enter the HOV lane L of the highway H1 and continues to travel in the normal lane L0. In such a case, because of the output of the guidance phrase "Keep right onto HWY-2, if you are NOT in the HOV lane", the driver of the vehicle A' may decide to change lanes to the right, since he or she is not currently traveling in the HOV lane L.

Therefore, the vehicle A' can merge with the traffic in the normal lane L0 of the highway H2 through the ramp W2 (i.e., the vehicle A' can transition from the normal lane L0 of the highway H1 to the normal lane L0 of the highway H2). At this point, since the vehicle A' uses the ramp W2, which is far from the ramp W1, the control unit, at S15, determines that the vehicle A' has deviated from the first route, and re-calculates a route. As a result, the guidance phrase for guiding the vehicle to the ramp W1 will not be provided when the vehicle arrives at the guidance point T3.

The route guidance from the vehicle navigation system of the present disclosure is provided based on the guidance data (A) that is generated according to an HOV lane prioritized condition (i.e., a special lane prioritized condition). Thus, appropriately guiding the driver to an HOV lane prioritized route that tries to use the HOV lane L as much as possible in the route calculation.

Further, by outputting a conditional guidance phrase, such as "if you are not in the HOV lane," based on the guidance data (B) for travel along the parallel route section, where the normal lane L0 and the HOV lane L run in parallel, the system can provide an appropriate guidance for the driver, even when the driver is traveling in the normal lane L0. In addition, the sound output of the guidance via a voice, such as a recorded voice or synthesized voice, makes it much easier for the driver to recognize and understand the contents of the guidance.

In the present embodiment, even when the vehicle is traveling in the HOV lane (i.e., in a special lane), the system can provide appropriate guidance. Such guidance can be provided based on a rough determination by the position detector 3 that provides the vehicle is traveling in the parallel route section where the special lane and the normal lane run in parallel. Therefore, according to the present disclosure, the vehicle navigation system provides a route that includes a parallel route section, where the special lane and the normal lane run in parallel, can now provide appropriate route guidance without identifying a currently-traveling lane of the road (e.g., highway). In other words, no special device for determining the currently-traveling lane of the road is required for the vehicle navigation system of the present disclosure.

Further, according to the present embodiment, when it is determined that the vehicle is currently traveling in the parallel route section, the first guidance phrase based on the guidance data (A) is output at the first guidance point, accompanied by the conditional phrase "if you are in the HOV lane." Therefore, not only for the vehicle traveling in the special lane but also for the vehicle traveling in the normal lane, appropriate route guidance is provided since the driver of the vehicle in the normal lane can simply disregard such guidance based on the conditional phrase. As a result, confusion due to the output of two different route guidance phrases based on the guidance data (A) and (B) is prevented.

During a parallel route section determination for determining whether the vehicle is currently traveling a parallel route section, when the currently-traveling road is an all HOV lane road and another road candidate, which at least has a normal lane, exists in proximity of the currently-traveling road, the vehicle is determined as traveling in a parallel route section. Alternatively, the vehicle is determined as traveling in a parallel route section when the currently-traveling road has a mixture of the HOV lane and the normal lane. In such manner, the parallel route section determination can securely be performed by the vehicle navigation system, which is equipped with the position detector 3 that has a normal (i.e., no-special) detection accuracy.

The "special lane" exemplified as the HOV lane for highway traffic in the United States of America in the description of the present embodiment may also be other types of vehicle lanes, such as:

High occupancy-toll lane (HOT lane): A lane of a road or a road that can be traveled for free for a vehicle that has at least a predetermined number of occupants. Otherwise, the vehicle is charged for the travel.

Express lane: A lane of a road or a road that restricts the number of vehicles by having fewer number of entrances and exits, thereby preventing slow traffic at or around the entrance or exit. The express lane is mainly intended for long-distance traveling vehicles in the freeway. No condition is set forth regarding the number of occupants.

Express toll lane (ETLs): A lane of a road or a road that can be traveled by paying a toll.

Further, setting an option for using the special lane, which is set by the user with the operation switch group 8 in the present embodiment, may be automatically performed based on an output from a sitting sensor that can automatically detect the number of occupants in the vehicle, and the use of the special lane may be automatically determined by an automatic determination unit. Such units may further improve the usability of the vehicle navigation system of the present disclosure.

Further, when it is determined by a determination unit that the vehicle is traveling in a parallel route section, a second route guidance unit may output the second guidance phrase that includes a conditional phrase, such as "if you are not in the special lane," at the second guidance point based on the second route that is calculated by the second route calculation unit, even when no-special-lane use option has been set by the setting unit.

Although the present disclosure has been fully described in connection with the preferred embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A vehicle navigation system comprising:
a position detector detecting a current position of a vehicle; and
a processor, operably connected to the position detector, and programmed to
calculate, in a first route calculation unit, a first route between a start point and a destination, the calculation of the first route prioritizing a special lane over a normal lane, the special lane conditionally allowing the vehicle to travel therein when the vehicle has fulfilled a precondition;
output, from a first route guidance unit, a first guidance phrase at a first guidance point as route guidance based on the first route calculated by the first route calculation unit;
determine, in a determination unit, whether the vehicle is traveling in a parallel route section based on the current position detected by the position detector, the parallel route section being where the special lane and the normal lane run in parallel;
calculate, in a second route calculation unit, a second route between the start point and the destination when the determination unit determines that the vehicle is traveling along the parallel route section, wherein the calculation of the second route is performed based on an assumption that the vehicle is traveling in the normal lane; and
output, from a second route guidance unit, a second guidance phrase at a second guidance point as route guidance based on the second route calculated by the second route calculation unit when the vehicle is determined to be traveling in the parallel route section which indicates that it is not determinable within which of the special lane or the normal lane the vehicle is traveling, wherein the second guidance phrase also includes a condition that conveys that the vehicle is not in the special lane.

2. The vehicle navigation system of claim 1, wherein the first route guidance unit outputs the first guidance phrase at the first guidance point with a condition setting phrase that conveys that the vehicle is in the special lane.

3. The vehicle navigation system of claim 1, wherein the determination unit determines that the vehicle is traveling in the parallel route section when a currently-traveled road along which the vehicle is traveling only has the special lane and another road candidate exists in proximity to the currently-traveled road, or when the currently-traveled road has both the special lane and the normal lane.

4. The vehicle navigation system of claim 1, wherein the route guidance is provided for entrance to one of two ramps when two ramps are available for a transition from a first road to a second road as a special lane ramp and a normal lane ramp.

5. The vehicle navigation system of claim 4, wherein the first road and the second road cross each other,
the special lane ramp connects the special lane of the first road with the special lane of the second road,
the normal lane ramp connects the normal lane of the first road with the normal lane of the second road, and
the special lane ramp and the normal lane ramp are set at two positions with a preset distance interposed therebetween along a traffic direction of the first road.

6. The vehicle navigation system of claim 1, wherein the first route guidance unit and second route guidance unit output a sound guidance phrase.

7. The vehicle navigation system of claim 1, wherein the special lane is a high occupancy vehicle lane that requires the vehicle traveling in the special lane to have at least a predetermined number of occupants.

8. The vehicle navigation system of claim 1 further comprising:
a setting unit for setting an option of whether to use the special lane.

9. The vehicle navigation system of claim 8, wherein the setting unit includes an auto-determination unit that automatically sets the option of whether to use the special lane.

10. The vehicle navigation system of claim 8, wherein the second route guidance unit outputs the second guidance phrase at the second guidance point based on the second route calculated by the second route calculation unit when the determination unit determines that the vehicle is traveling in the parallel route section and when the option set by the setting unit indicates a non-use of the special lane.

* * * * *